March 24, 1936. F. B. CARKHUFF 2,034,795
SEDIMENT DETECTING DEVICE
Filed Nov. 23, 1934   2 Sheets-Sheet 2
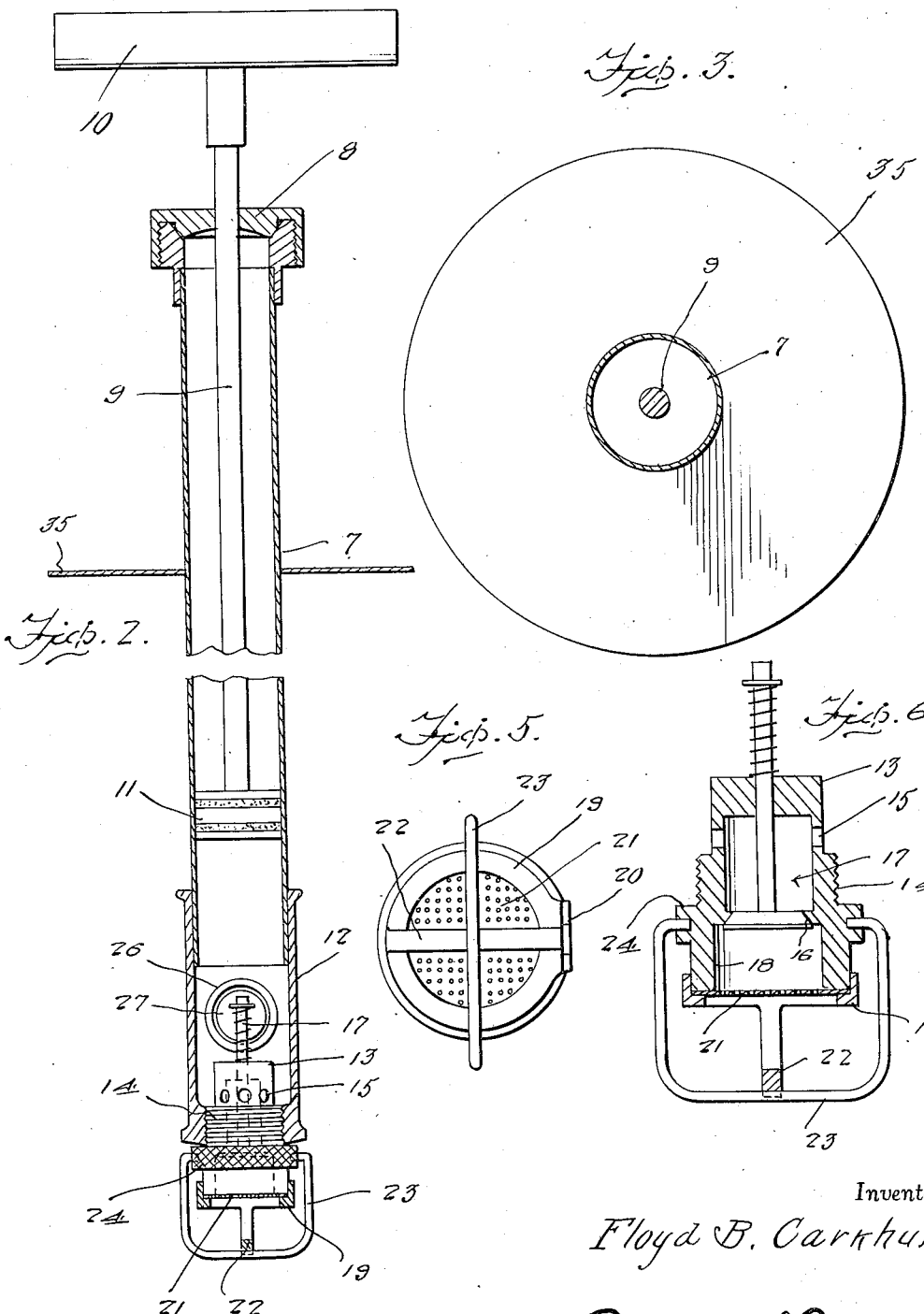
Inventor
Floyd B. Carkhuff
By Clarence A. O'Brien
Attorney Patented Mar. 24, 1936

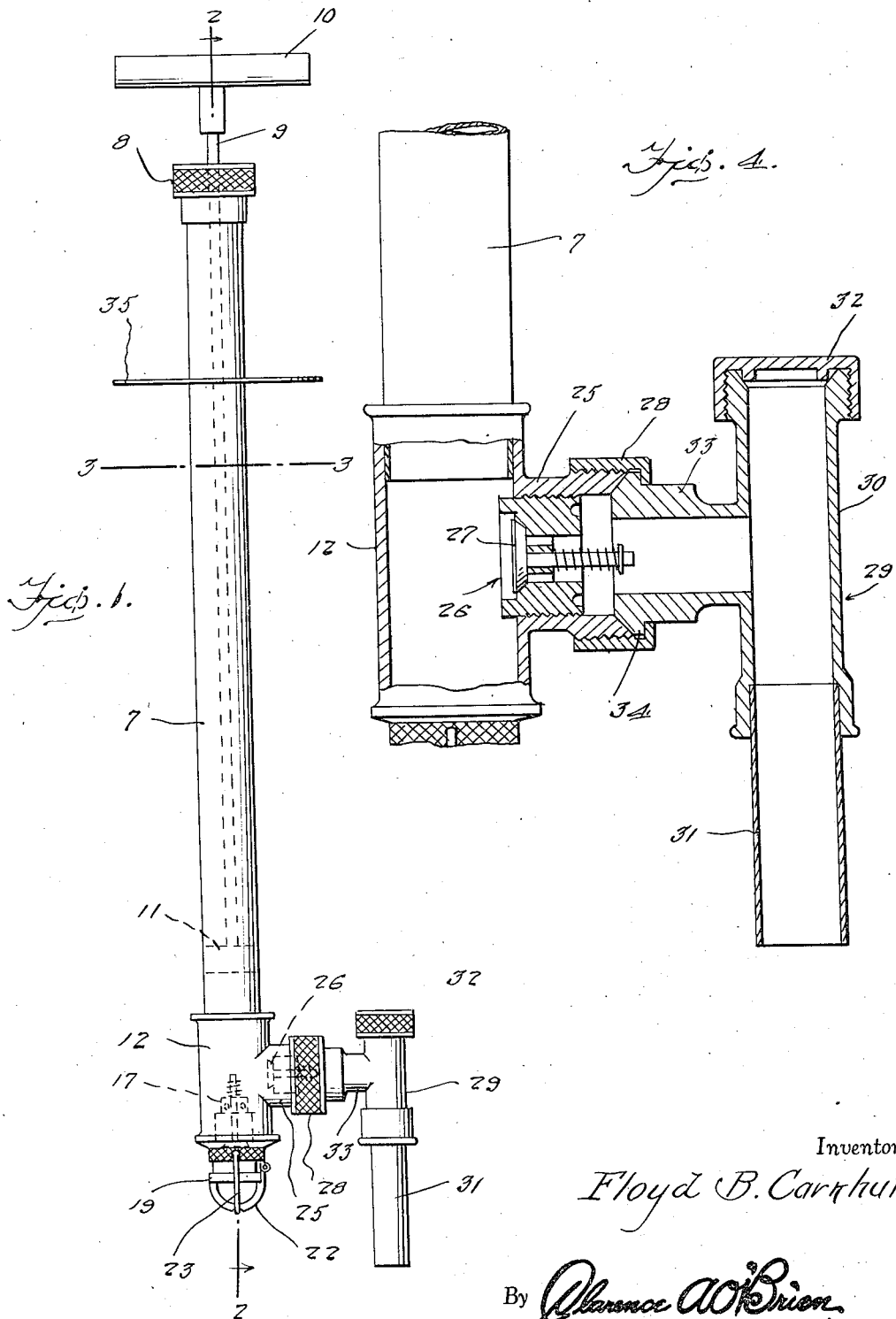

2,034,795

UNITED STATES PATENT OFFICE 2,034,795

SEDIMENT DETECTING DEVICE

Floyd B. Carkhuff, Binghamton, N. Y.

Application November 23, 1934, Serial No. 754,549

2 Claims. (Cl. 73—51)

This invention relates to a milk sample taking and testing device expressly designed for detecting the presence of sediment in milk.

Briefly described, the preferred embodiment of the invention comprises a hand-controlled pump provided with alternately operable valves at its working end, one valve being actuated by a reciprocatory plunger to suck the column of milk or other fluid into the cylinder, and the other valve being in the nature of a pressure-actuated check valve located to successively discharge the milk so that by passing it through a fabric testing and/or straining disk, the sediment is trapped by the disk, and the disk thereafter removed to determine the approximate amount of sediment, if any, contained in the sample thus tested.

One feature of the invention has to do with the adoption and use of a simple and economical pump structure wherein the features selected allow the device, as a unit, to be inserted into an ordinary forty quart milk can, or similar container so that the test may be made quickly and expeditously if and when needed.

An advantage is derived from the adoption and use at the valved end of the structure of a special elbow attachment whose intake end depends below the discharge end of the main cylinder to serve as a stop for limiting the insertion of the cylinder into the body of the milk or other fluid and to provide the requisite clearance for discharging the milk back into the can after the test has been made.

Specific structural novelty is also thought to reside in the construction and arrangement of the pressure-controlled discharge valve means which includes a cotton filtering pad or disk holder susceptible of expeditious insertion and removal to allow the results of the test to be accurately determined.

Other features and advantages will become more readily apparent from the following description and drawings.

In the drawings:

Figure 1 is an elevational view of a sample taking and testing device as constructed in accordance with the principles of the present invention.

Figure 2 is a view in section and elevation, which view may be satisfactorily described as a longitudinal section taken on the plane of the line 2—2 of Figure 1.

Figure 3 is an enlarged cross sectional view taken at right angles on the line 3—3 of Figure 1.

Fig. 4 is an enlarged detail view illustrating in particular the special adapter means serving as a rest and valved intake unit.

Fig. 5 is a bottom plan view of the discharge valve means illustrating the hinged cup holder for the removable cotton pad or filter disk.

Fig. 6 is a detail sectional and elevational view of the discharge valve means, that is, the valve and cage assembly.

Referring now to the drawings by distinguishing reference numerals, it will be observed that the pump is a simple hand-controlled arrangement and includes a cylinder 7 of appropriate dimensions. As shown in Fig. 2, the cylinder is provided at its top with an appropriately fashioned and air vented closure or cap 8 which is constructed to function as a guide for the reciprocatory rod 9 of the plunger. It is apparent that with this arrangement sufficient leakage of air takes place between the rod 9 and the cap to prevent the formation of an air cushion above the piston 11. The rod is provided at its top with a suitable hand grip 10 so that the plunger may be operated like an ordinary tire pump. The head 11 of the plunger is suitably packed. This provides the desired piston controlled suction or intake and expulsion action for the cylinder.

The essential novelty is embodied in the duplex successively operable valve assembly means at the lower end of the cylinder. Attention first comes to that part which may be described as T-coupling 12. The main branch of this is internally screw threaded to accommodate the discharge valve assembly shown in Fig. 6. This assembly comprises a hollow plug 13 which is fashioned to fit telescopically into the part 12 and which is formed intermediate its ends with a screw threaded attaching ring or annulus 14. The numeral 15 designates the milk or other fluid inlet ports, the numeral 16 designates the valve seat, and 17 the spring-closed pressure-opened check valve which is co-operable with said seat. This is an ordinary mushroom or poppet valve and the stem which is provided with a return spring, extends through a guide opening in the plug 13. In a sense, the plug forms a sort of a cage or container for the reciprocatory valve and the lower end portion 18 may be said to form a milk or other fluid trap below the valve. This trap is completed by the presence of a flanged ring 19 hingedly attached in place as at 20 and forming a cup. This cup is provided with a strainer 21 and in practice, a cotton disk or pad is placed in this cup against the strainer, the pad being sufficiently porous to allow the milk to filter therethrough while at the same time trapping the sediment, if any, which is in the milk or other fluid being tested. The cap is provided with a central integral retaining member 22 which depends to an accessible point and which is provided with a keeper notch to accommodate the bight portion of the retaining bail 23. The bail has its arm portions swingably mounted on an annulus 24 on a central portion of the cage or plug. It follows, therefore, that the valve assembly comprises a plug to tap into the threaded portion of the main branch of the T-coupling 12. The trap is valved and provided with discharge ports and also provided with a milk or other fluid trap, the trap being partially defined by the presence of a hinged cup to contain the cotton disk or pad. The features 22 and 23 provide a conveniently accessible and easily operable retaining means whereby the pad can be inserted before making the test and removed after the test is made.

Directing attention now to the suction-actuated milk intake valve assembly, attention is invited to Figure 4. This assembly is attached to the relatively short branch 25 of the T-coupling. In fact, the branch 25 is internally screw threaded to accommodate a nut or bushing 26 which is fashioned to provide a valve carrier and seat. That is to say, this bushing or fitting 26 is provided with a valve seat to accommodate the head 27 of the suction-actuated spring-closed check valve. This branch 25 of the coupling also serves to accommodate a flanged union 28 which serves as a connecting means for holding the special adapter unit 29 in place. The adapter is formed with a tubular body 30 carrying an intake nipple 31 and a removable closing cap 32 at its top. It also includes a part 33 which may be conveniently denoted as an attaching or joining neck and this is flanged to fit in the flanged portion of the union 28. This headed or flanged end 34 is beveled to match the correspondingly shaped end portion of the branch 25 thus providing a swivel connection between the T-coupling 12 and the adapter unit 29. Consequently the unit can be adjusted at the desired angle and clamped in place by the union or ring 28 so that the parts can be regulated to assume positions in proper relationship for more effective results.

In addition to the swivel mounting of the adapter unit 29, it is to be observed that the nipple 31 projects down beyond the valve assembly means, that is, the discharge valve arrangement as shown in Fig. 1. Hence, in a sense it can be employed as a rest or gage to limit the insertion into the milk can of the testing device as a whole. If desired however, a shoulder-forming or stop disk 35 may be utilized, this being attached to the upper end portion of the pump cylinder. The disk may be of suitable diameter to rest on the neck of the milk can or other container to aid in handling the pump and also provides a stop or guard to keep the operator's hands away from that portion of the main cylinder which is inserted into the fluid to be tested, thus preventing contamination and keeping the cylinder sterile.

In practice, the testing device is inserted into a conventional milk or other fluid filled can, say of the five or ten gallon type. Then by grasping a hold of the piston and pulling it upwardly, the milk or other fluid is sucked into the cylinder 7 by way of the adapter 29 and the valve 27. When the suction stroke is stopped, the valve closes under the action of a spring. That is to say, this is an ordinary suction-controlled check valve. Then on the return or downward stroke of the piston, the column of milk or other fluid is forced through the ports 15 in the cage 13 to force the valve 17 open. The milk or other fluid is trapped in the receptacle 18 and forced through the cotton disk (not shown) which is held in the hinged cup 29. After the complete sample is ejected from the cylinder, the retaining bail 23 is released from the keeper member 22 thus swinging the cup open to expose and permit removal of the indicator disk. It follows, therefore, that a reasonably accurate test as to sediment can be made through the instrumentality of this invention.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details coming within the field of invention claimed may be resorted to in actual practice, if desired.

I claim:—

1. In a milk or other fluid sample taking and testing device of the class described, a hand actuated pump including a cylinder, a piston mounted for reciprocation in said cylinder, an intake valve connected with said cylinder, an adapter associated with said valve for delivering milk from the container into the cylinder by way of said valve, fluid pressure operated discharge valve means also connected with said cylinder at the discharge end thereof, said discharge valve means including a chamber having screw-threaded engagement with said cylinder, a reciprocating check valve in said chamber, an integral annulus located at the lower portion of said chamber, a cupped ring member hingedly secured to the lower portion of said chamber, and adapted to receive said annulus, said cupped member having an arcuate depending notched portion, and a bail pivotally mounted on said annulus and adapted to releasably engage the notch in said depending portion for securing the same in position on the chamber, said cupped member being adapted to contain a disk of cotton to serve as a filter.

2. In a sediment detecting and fluid sample taking device of the class described, a hand pump including a cylinder provided with a reciprocatory plunger, inlet valve means attached to the intake end of said cylinder, and a discharge valve assembly connected with the same end of said cylinder, said assembly including a hollow plug open at its bottom, the inner end portion of said plug being formed with a valve stem guide opening and a plurality of fluid discharge ports, the intermediate portion of the plug being formed with screw-threads to releasably engage a complemental portion of the cylinder, said intermediate portion being further provided with an outstanding knurled annulus provided to serve as a stop element and finger grip, said plug being formed internally intermediate its ends with a valve seat, a valve including a head cooperable with said seat and a spring equipped stem slidable through said guide opening, a cup hingedly connected to the lower or outer end of said plug, a removable filtering disk fitted in the cup and interposed between the cup and adjacent end of said plug, said cup being provided with a depending keeper, and a retention bail having its arm portions pivotally attached to said finger grip and having its bight portion located for releasable connection with said keeper element.

FLOYD B. CARKHUFF.